(12) United States Patent
Yu et al.

(10) Patent No.: US 11,512,486 B2
(45) Date of Patent: Nov. 29, 2022

(54) HOUSE STRUCTURE WITH EXPANDABLE FUNCTION

(71) Applicants: Chuan Yu, Guizhou (CN); Ming Zhang, Guizhou (CN); Dechong Zeng, Guizhou (CN); Jiangshan Li, Guizhou (CN)

(72) Inventors: Chuan Yu, Guizhou (CN); Ming Zhang, Guizhou (CN); Dechong Zeng, Guizhou (CN); Jiangshan Li, Guizhou (CN)

(73) Assignee: Guizhou HanKaiSi Intelligent Technology Co., Ltd., Guizhou (CN)

( * ) Notice: Subject to any disclaimer, the term of this patent is extended or adjusted under 35 U.S.C. 154(b) by 267 days.

(21) Appl. No.: 16/904,591

(22) Filed: Jun. 18, 2020

(65) Prior Publication Data

US 2021/0189749 A1    Jun. 24, 2021

(30) Foreign Application Priority Data

Dec. 20, 2019 (CN) .......................... 201911329461.2

(51) Int. Cl.
| | |
|---|---|
| *E04H 1/00* | (2006.01) |
| *E04H 14/00* | (2006.01) |
| *G01C 21/20* | (2006.01) |
| *G01S 19/42* | (2010.01) |
| *G05D 1/02* | (2020.01) |

(52) U.S. Cl.
CPC ............ *E04H 1/005* (2013.01); *E04H 14/00* (2013.01); *G01C 21/206* (2013.01); *G01S 19/42* (2013.01); *G05D 1/0212* (2013.01); *G05D 1/0231* (2013.01); *G05D 1/0257* (2013.01)

(58) Field of Classification Search
CPC ......... E04H 1/005; E04H 6/30; G01C 21/206; G05D 1/0212; G05D 1/0231; E04B 1/34807
See application file for complete search history.

(56) References Cited

U.S. PATENT DOCUMENTS

| | | | | |
|---|---|---|---|---|
| 5,002,449 A | * | 3/1991 | Kita ...................... | B65G 1/0492 |
| | | | | 414/280 |
| 9,630,777 B2 | * | 4/2017 | Yamashita ........... | B65G 1/0485 |
| 11,067,329 B2 | * | 7/2021 | Boer .................... | B65G 1/0492 |
| 2017/0002579 A1 | * | 1/2017 | French ................ | E04B 1/34807 |
| 2018/0134492 A1 | * | 5/2018 | Lert, Jr. ............. | G05B 19/41815 |
| 2019/0009985 A1 | * | 1/2019 | Lert, Jr. ............. | B65G 1/0492 |
| 2019/0100934 A1 | * | 4/2019 | Ansari ...................... | E04H 5/02 |

(Continued)

*Primary Examiner* — Gisele D Ford (57) ABSTRACT

The invention discloses a house structure with expandable function, comprising a house body (20), wherein an elevator shaft (21) is provided in the house body (20), and a carrying elevator (22) is provided in the elevator shaft (21); a multifunctional balcony (23) is further provided on both sides of the elevator shaft (21), and the multifunctional balcony (23) and the elevator shaft (21) are connected via a landing door (24); the car of the carrying elevator (22) is provided with a car front door, a car left door and a car right door, respectively; a multifunctional cabin (1) can be detachably connected to an automatic carrying system (35) capable of autonomous driving. The house structure provided by the invention can take into account the owner's demand for various aspects of the house, and improves the functionality of the house.

8 Claims, 12 Drawing Sheets

(56) References Cited

U.S. PATENT DOCUMENTS

2020/0040594 A1\* 2/2020 Hedberg ................. E04H 1/005
2020/0166267 A1\* 5/2020 Boer .................... B65G 1/0492
2020/0362578 A1\* 11/2020 Zheng ....................... E04H 1/04

\* cited by examiner

HOUSE STRUCTURE WITH EXPANDABLE FUNCTION

BACKGROUND OF THE INVENTION

1. Field of the Invention

The invention relates to the field of construction, in particular to a house structure with expandable function.

2. Description of the Related Art

As land resources become increasingly tense, and the area of family housing is constantly being compressed, many times a house is often unable to take into account the comprehensive use needs of the owner. Taking the ordinary three-bedroom as an example, the general usage habit of the three bedrooms is: one for the master bedroom, one for the children's room, and one for the guest room; if the owner still has a need for a study room, there will be trade-offs in demand, which is difficult to fully consider the needs of the owner

SUMMARY OF THE INVENTION

The objective of the invention is to provide a house structure with expandable function. The house structure provided by the invention can take into account the owner's demand for various aspects of the house, and improves the functionality of the house.

Technical solutions of the invention: a house structure with expandable function, comprising a house body, wherein an elevator shaft is provided in the house body, and a carrying elevator is provided in the elevator shaft; a multifunctional balcony is further provided on both sides of the elevator shaft, and the multifunctional balcony and the elevator shaft are connected via a landing door; the car of the carrying elevator is provided with a car front door, a car left door and a car right door, respectively; a multifunctional cabin can be detachably connected to an automatic carrying system capable of autonomous driving.

In the house structure with expandable function above, an electrical plug is provided on the wall of the multifunctional balcony opposite to the landing door, and the electrical plug is detachably connected to the multifunctional cabin.

In the house structure with expandable function above, the automatic carrying system comprises a deck; the top of the deck is detachably connected to the bottom of the multifunctional cabin, and the bottom of the deck is detachably connected to a chassis capable of autonomous driving; a landing gear is provided on both sides of one end of the deck, a rear seat is provided at the other end, and a rear wheel is provided at the bottom of the rear seat; a vehicle pin is provided at the bottom of the deck; a vehicle coupler is provided on the rear end of the chassis, and an attitude correction module is further provided on the chassis; the chassis can pass through the distance between the two landing gears, and can be detachably connected to the deck via coupling/decoupling of the vehicle coupler and the vehicle pin.

In the house structure with expandable function above, a joint positioning module is provided on the rear side of the rear seat.

In the house structure with expandable function above, the joint positioning module comprises:

a positioning camera unit for collecting position information of the electrical plug on the wall;

a positioning single line laser radar for the docking positioning detection between the multifunctional cabin and the electrical plug on the wall;

a positioning millimeter wave radar for measuring the distance between the multifunctional cabin and the electrical plug on the wall.

In the house structure with expandable function above, a pair of reflecting plates III is further provided on the wall of the multifunctional balcony opposite to the landing door, and the electrical plug is located in the middle of the two reflecting plates III.

In the house structure with expandable function above, a docking fine-tuning mechanism is provided at the bottom of the chassis, and the docking fine-tuning mechanism comprises a lifting support mechanism; the lower four corners of the lifting support mechanism are provided with Mecanum wheels, and each Mecanum wheel is driven by a fine-tuning drive motor individually.

In the house structure with expandable function above, the attitude correction module comprises:

an inertial navigation unit provided on the chassis, a side camera unit and a side millimeter wave radar provided on both sides of the chassis, a rear single line laser radar and a rear millimeter wave radar provided at the rear of the chassis, a front single line laser radar and a front millimeter wave radar provided at the front of the chassis.

In the house structure with expandable function above, a reflecting plate I is provided on the front side of the rear seat; a reflecting plate II is provided on the front side of the landing gear.

In the house structure with expandable function above, a lifting mechanism is further provided at the front end of the chassis, and the lifting mechanism is provided with a front camera unit, a real-time satellite positioning system and a three-dimensional laser radar.

Advantageous Effects

Compared with the prior art, the invention provides a multifunctional balcony on both sides of the elevator shaft of the house body, and the elevator shaft and the multifunctional balcony are connected via a landing door; the multifunctional cabin, which is carried by the automatic carrying system and customized according to the needs of the owner can be placed on the multifunctional balcony, and the multifunctional cabin can also be carried away through the automatic carrying system; for example, for three-bedroom houses, due to the long-term vacancy of the guest room and the low frequency of use, the three bedrooms can be set as relatively fixed functions, that is, one for the master bedroom, one for the children's room, and one for the study room; while the guest room can be replaced by a multifunctional cabin; after use, the multifunctional cabin can be carried away. In addition, the multifunctional cabin can be customized according to the needs of the owner, such as the entertainment room, kitchen, etc.; when there is no demand, the multifunctional balcony is vacated and used as a normal balcony. The functionality of the balcony is fully enhanced, and the functionality of the house is improved overall through this structure, so that the contradiction that it is difficult to take into account the needs of the owner is solved.

In the invention, the automatic carrying system is set as a structure in which the bottom of the deck can be detachably connected to the chassis capable of autonomous driving; when the multifunctional cabin is carried, the top of the deck and the bottom of the multifunctional cabin are detachably connected; it is more conducive to the modular design and more conducive to the custom design of the multifunctional cabin through this structure. The invention uses the deck as an intermediate connection structure to realize the separation and use of the chassis and the multifunctional cabin, so as to realize the sharing of the chassis, which effectively saves resources; through the matching use of the deck and the multifunctional cabin of different customized functions, the customized function of the multifunctional cabin is technically realized, and the functionality of the owner's house is better improved.

The invention is provided with a landing gear on both sides of the front end of the deck and the vehicle pin at the bottom of the deck; a vehicle coupler is provided on the rear end of the chassis, and the chassis can pass through the distance between the two landing gears, and can be detachably connected to the deck via coupling/decoupling of the vehicle coupler and the vehicle pin; this structure enables that after the deck is connected to the chassis, the chassis is basically on the bottom board, so that the structure of the vehicle is more compact, and the footprint of the vehicle is reduced, and the driving and control of the vehicle body are more flexible; therefore, the vehicle body of this structure has stronger adaptability to relatively crowded and narrow road conditions such as urban roads.

The invention is provided with a reflecting plate I and a reflecting plate II on the front sides of the rear seat and the landing gear, and a pair of reflecting plates III is further provided on the wall of the multifunctional balcony opposite to the landing door; with this structure, the reflection effect of the radar wave can be enhanced, and then the attitude correction module can collect a clearer and more accurate environmental signal, and the accuracy of the attitude correction module to correct the attitude of the chassis is improved, thereby improving the success rate of the docking of the chassis and the deck and the success rate of the docking of the multifunctional cabin and the electrical plug.

In the figures, 1 refers to the multifunctional cabin; 2 refers to the deck; 3 refers to the chassis; 4 refers to the landing gear; 5 refers to the rear seat; 6 refers to the rear wheel; 7 refers to the vehicle pin; 8 refers to the vehicle coupler; 9 refers to the attitude correction module; 901 refers to the inertial navigation unit; 902 refers to the side camera unit; 903 refers to the side millimeter wave radar; 904 refers to the rear single line laser radar; 905 refers to the rear millimeter wave radar; 906 refers to the front single line laser radar; 907 refers to the front millimeter wave radar; 10 refers to the reflecting plate I; 11 refers to the reflecting plate II; 12 refers to the lifting mechanism; 13 refers to the front camera unit; 14 refers to the real-time satellite positioning system; 15 refers to the three-dimensional laser radar; 16 refers to the horizontal support arm; 17 refers to the vertical support arm; 18 refers to the electric putter I; 19 refers to the electric putter II; 20 refers to the house body; 21 refers to the elevator shaft; 22 refers to the carrying elevator; 23 refers to the multifunctional balcony; 24 refers to the landing door; 25 refers to the electrical plug; 26 refers to the pipe connector; 27 refers to the positioning camera unit; 28 refers to the positioning single line laser; 29 refers to the positioning millimeter wave radar; 30 refers to the reflecting plate III; 31 refers to the lifting support mechanism; 32 refers to the Mecanum wheel; 33 refers to the fine-tuning motor; 34 refers to the balcony door; 35 refers to the automatic carrying system.

DETAILED DESCRIPTION OF THE PREFERRED EMBODIMENTS

The invention is further described hereinafter with reference to the drawings and embodiments, but it is not intended to limit the invention.

Figure 1:
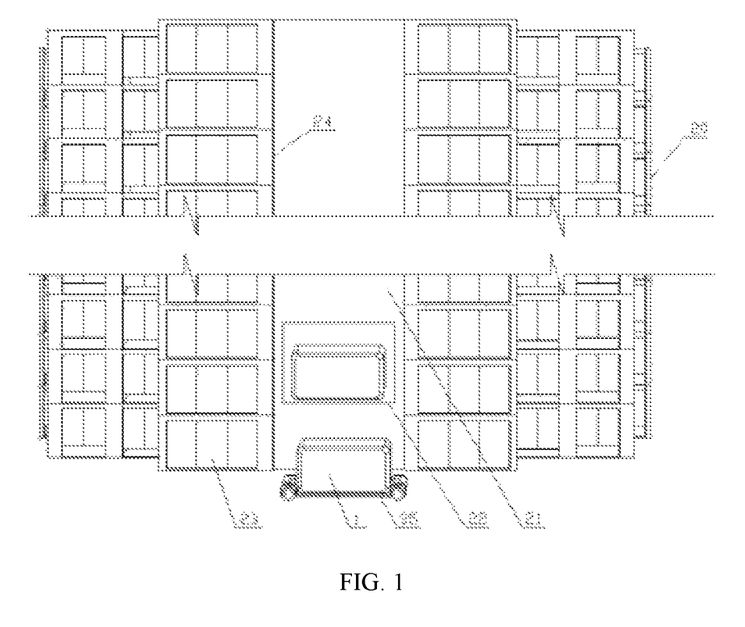
FIG. 1 is a schematic view illustrating the structure of Embodiment 1 of the invention.
Figure 2:
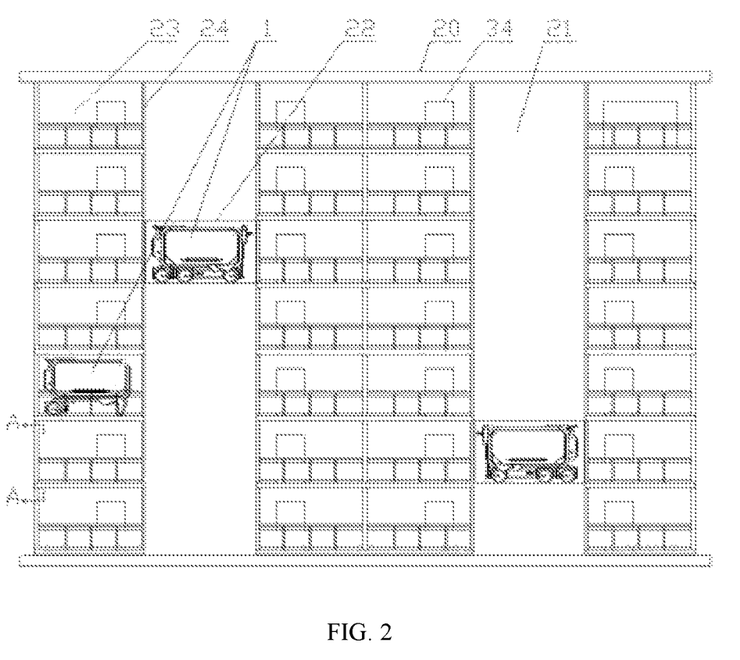
FIG. 2 is a schematic view illustrating the structure of Embodiment 2 of the invention.
Figure 3:
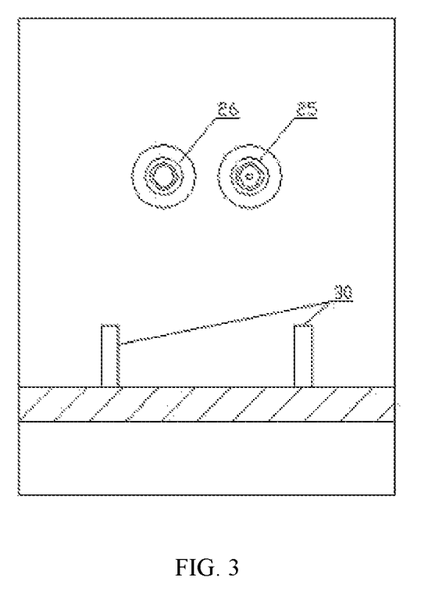
FIG. 3 is an A-A cross-sectional view of FIG. 1.
Figure 4:
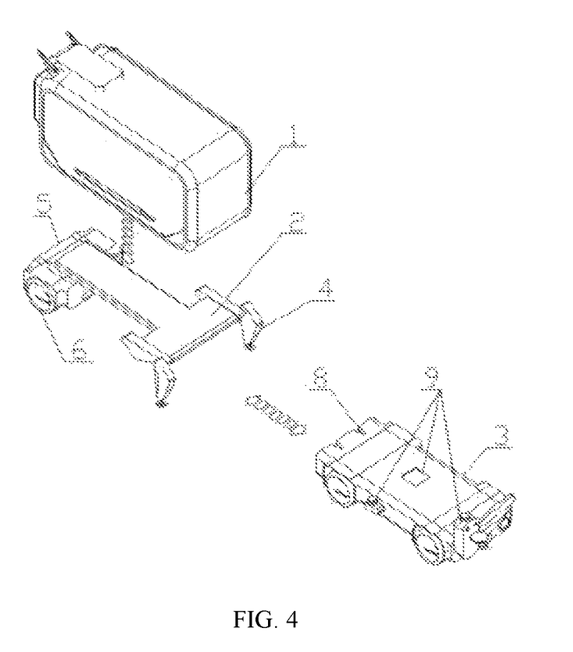
FIG. 4 is a schematic view illustrating the structure of the subassembly of the multifunctional cabin, deck, and chassis of the invention.
Figure 5:
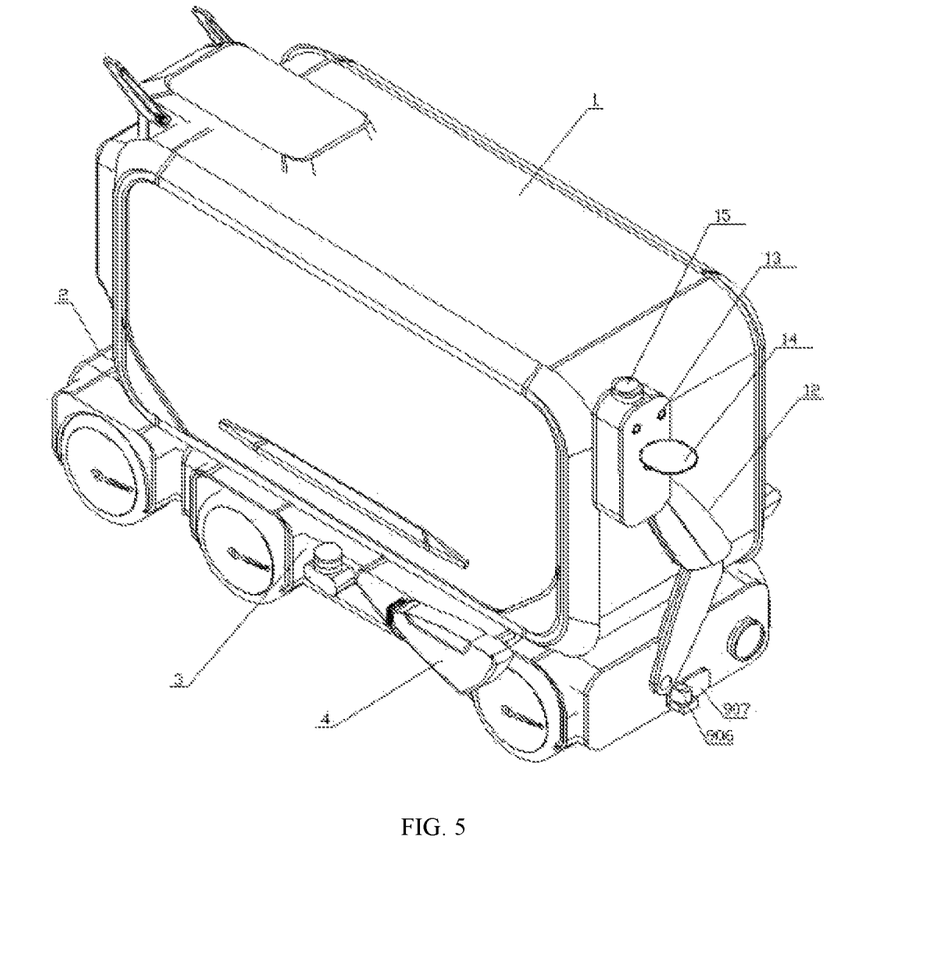
FIG. 5 is a front isometric view of the assembly of the multifunctional cabin, deck and chassis of the invention.
Figure 12:
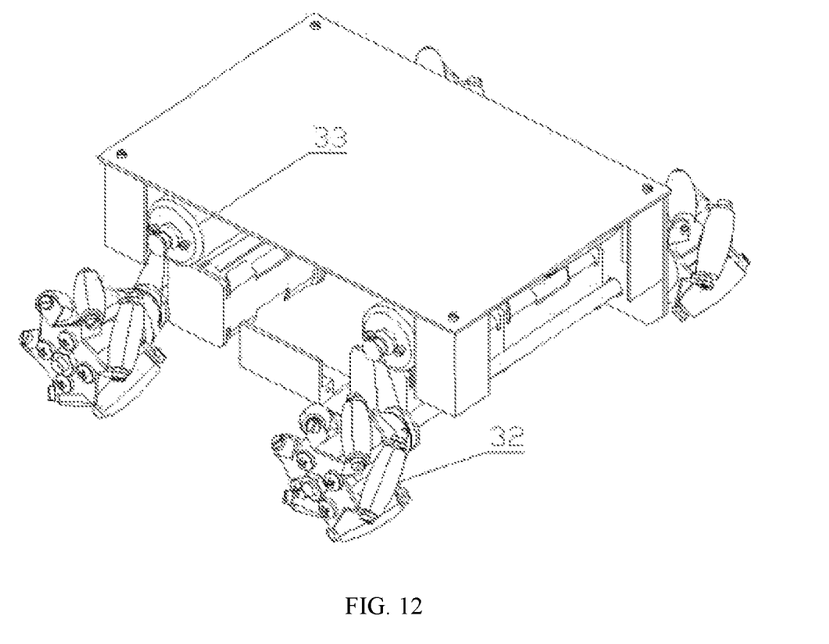
FIG. 12 is a schematic view illustrating the structure of the connection of the Mecanum wheels and the fine-tuning drive motor.

Embodiment 1. A house structure with expandable function, with reference to FIG. 1, comprising a house body 20, wherein an elevator shaft 21 is provided in the house body 20, and a carrying elevator 22 is provided in the elevator shaft 21; a multifunctional balcony 23 is further provided on both sides of the elevator shaft 21, and the multifunctional balcony 23 and the elevator shaft 21 are connected via a landing door 24; the car of the carrying elevator 22 is provided with a car front door, a car left door and a car right door, respectively; a multifunctional cabin 1 can be detachably connected to an automatic carrying system 35 capable of autonomous driving. A translation mechanism is provided at the bottom of the multifunctional cabin 1, and the translation mechanism is used to translate the multifunctional cabin 1 into the elevator; after the multifunctional cabin 1 is carried to the designated position, the translation mechanism then translates the multifunctional cabin 1 onto the multifunctional balcony 23. The structure of the translation mechanism is shown in FIG. 12.

Embodiment 2. A house structure with expandable function, with reference to FIG. 1, comprising a house body 20, wherein an elevator shaft 21 is provided in the house body 20, and a carrying elevator 22 is provided in the elevator shaft 21; a multifunctional balcony 23 is further provided on both sides of the elevator shaft 21, and the multifunctional balcony 23 and the elevator shaft 21 are connected via a landing door 24; the car of the carrying elevator 22 is provided with a car front door, a car left door and a car right door, respectively; a multifunctional cabin 1 can be detachably connected to an automatic carrying system 35 capable of autonomous driving.

The working steps of the invention are as follows:

a. the multifunctional cabin 1 is carried into the carrying elevator 22 by the automatic carrying system 35;

b. the car front door is opened, the multifunctional cabin 1 is carried into the carrying elevator 22 by the automatic carrying system 35, and the car front door is closed;

c. the carrying elevator 22 carries the multifunctional cabin 1 to the corresponding floor along the elevator shaft 21, so that the car left/right door is aligned with the corresponding landing door 24;

d. the landing door 24 and the car left/right door are opened at the same time, and the automatic carrying system 35 carries the multifunctional cabin 1 through the landing door 24 to the multifunctional balcony 23;

e. after the multifunctional cabin 1 is placed on the multifunctional balcony 23, the automatic carrying system 35 is separated from the multifunctional cabin 1, and enters the carrying elevator 22 alone to leave the multifunctional balcony 23; at this time, the door of the multifunctional cabin 1 is just aligned with the balcony door 34 on the multifunctional balcony 23, which is convenient for the owner to enter the multifunctional cabin 1;

f. after the user uses the multifunctional cabin 1, the automatic carrying system 35 comes to the multifunctional balcony 23 to carry the multifunctional cabin 1 away.

An electrical plug 25 is provided on the wall of the multifunctional balcony 23 opposite to the landing door 24, and the electrical plug 25 is detachably connected to the multifunctional cabin 1. The detachably connected electrical plug 25 can be passed through a conventional male-female plug structure; through this structure, household electricity can be directly connected to the multifunctional cabin 1 to ensure continuous power supply. In addition, a pipe connector 26 can also be added on the wall surface as required to ensure that the multifunctional cabin 1 (such as a customized kitchen function cabin) of the corresponding function can be connected to household domestic water.

The automatic carrying system 35 comprises a deck 2; the top of the deck 2 is detachably connected to the bottom of the multifunctional cabin 1, and the bottom of the deck 2 is detachably connected to a chassis 3 capable of autonomous driving; a landing gear 4 is provided on both sides of one end of the deck 2, a rear seat 5 is provided at the other end, and a rear wheel 6 is provided at the bottom of the rear seat 5; a vehicle pin 7 is provided at the bottom of the deck 2; a vehicle coupler 8 is provided on the rear end of the chassis 3, and an attitude correction module 9 is further provided on the chassis 3; the chassis 3 can pass through the distance between the two landing gears 4, and can be detachably connected to the deck 2 via coupling/decoupling of the vehicle coupler 8 and the vehicle pin 7.

When the automatic carrying system 35 carries the multifunctional cabin 1, the multifunctional cabin 1 customized with the corresponding function is fixed on the deck 2 (the conventional fixing is sufficient), and then the chassis 3 is automatically driven to the vicinity of the deck 2; afterwards, the attitude correction module 9 continuously corrects the attitude of the chassis 3 according to the collected environmental signals around the deck 2, so that the rear end of the chassis 3 is aligned between the two landing gears 4 and passes through, and the vehicle coupler 8 is coupled to the vehicle pin 7 to complete the docking, then the landing gears 4 are retracted to perform carrying; when the destination is reached, the landing gears 4 are pulled down, and the vehicle coupler 8 releases the vehicle pin 7 to complete the separation; after the separation, the chassis 3 can automatically drive away from the multifunctional balcony 23.

A joint positioning module is provided on the rear side of the rear seat 5.

After the multifunctional cabin 1 is carried to the multifunctional balcony 23, the electrical plug 25 and/or the pipe connector 26 can be accurately docked through this module.

The joint positioning module comprises:

a positioning camera unit 27 for collecting position information of the electrical plug 25 and/or the pipe connector 26 on the wall;

a positioning single line laser radar 28 for the docking positioning detection between the multifunctional cabin and the electrical plug 25 and/or the pipe connector 26 on the wall;

a positioning millimeter wave radar 29 for measuring the distance between the multifunctional cabin and the electrical plug 25 and/or the pipe connector 26 on the wall.

Through the information collection of the positioning camera unit 27, the positioning single line laser radar 28, and the positioning millimeter wave radar 29, the system can fine-tune the positional relationship between the electrical plug 25 and/or the pipe connector 26 on the wall and the multifunctional cabin, and finally achieve the precise docking of the corresponding connector.

A pair of reflecting plates III 30 is further provided on the wall of the multifunctional balcony 23 opposite to the landing door 24, and the electrical plug 25 is located in the middle of the two reflecting plates III 30. The reflecting plate III 30 can enhance the reflection of the positioning millimeter wave radar 29, and is more conducive to positioning the corresponding joint of the millimeter wave radar 29; setting the corresponding joint in the middle enables the calculation of the position of the system to be easier and reduces the amount of calculation.

Figure 11:
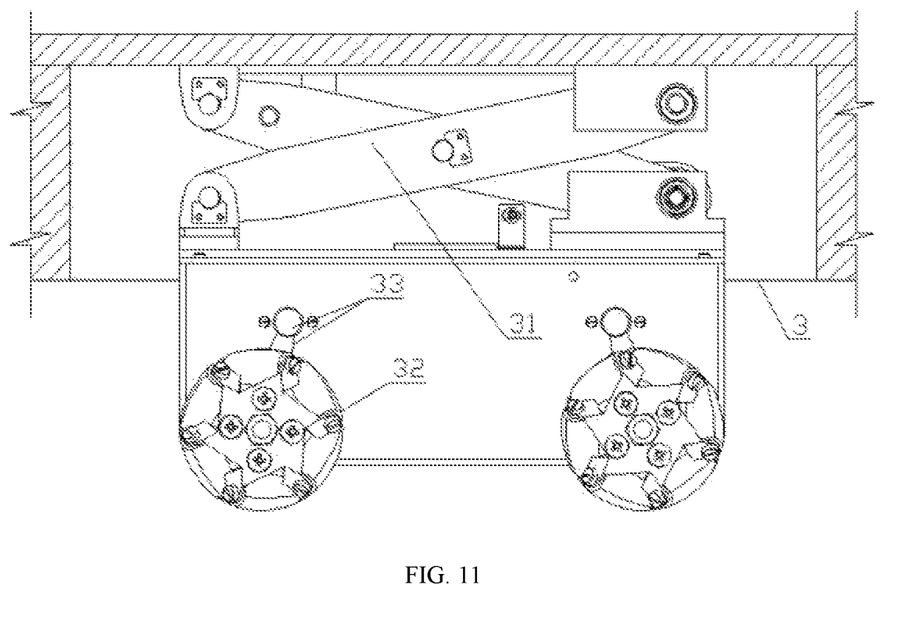
FIG. 11 is a schematic view illustrating the structure of the docking fine-tuning mechanism.

A docking fine-tuning mechanism is provided at the bottom of the chassis 3, and the docking fine-tuning mechanism comprises a lifting support mechanism 31; the lower four corners of the lifting support mechanism 31 are provided with Mecanum wheels 32, and each Mecanum wheel 32 is driven by a fine-tuning drive motor 33 individually. This mechanism is set in consideration of facilitating the automatic carrying system 35 to enter/exit the carrying elevator 22 and facilitating the adjustment of the attitude of the multifunctional cabin 1 in the small space of the multifunctional balcony 23 to realize the docking with the electrical plug 25 and/or the pipe connector 26; when in use, the lifting support mechanism 31 is raised to make the Mecanum wheels 32 support the wheels of the chassis 3 off the ground; at this time, the speed of each trimming drive motor 33 is adjusted to drive the Mecanum wheels 32 to move at the same or different speeds to realize the movement or rotation of the front, rear, left and right of the chassis, thereby achieving the fine-tuning of the attitude of the multifunctional cabin 1 (applicable when the electric plug 25 and/or the pipe connector 26 are docked in the balcony) and the translation of the automatic carrier system 35 (applicable when entering and exiting the car front door).

The attitude correction module 9 comprises:

an inertial navigation unit 901 provided on the chassis 3, which is used to provide attitude information; the inertial navigation unit 901 can complement the real-time satellite positioning system and laser radar data, and can provide additional data support in the Z-axis direction for the real-time satellite positioning system when there are scenes of non-planar and height differences;

a side camera unit 902 and a side millimeter wave radar 903 provided on both sides of the chassis 3, wherein the side camera unit 902 is used to collect image data, and the side millimeter wave radar 903 is used to measure distance information of side obstacles; the side millimeter wave radar 903 is a Doppler effect sensor, which is more sensitive to moving objects with speed, and at the same time is more sensitive to metal objects than non-metal objects; the millimeter wave radar mainly outputs obstacle distance information; the main function of the side camera unit 902 is to collect image data; by segmenting and processing the collected image data, and combining millimeter wave radar and laser radar to classify and predict obstacles, the obstacles that may exist in the lateral orientation are detected, and the distance of the obstacles from the vehicle body is calculated;

a rear single line laser radar 904 and a rear millimeter wave radar 905 provided at the rear of the chassis 3, wherein the rear single line laser radar 904 is used for the docking positioning detection between the multifunctional cabin and the chassis, and the rear millimeter wave radar 905 is used to measure distance information of obstacles in the rear; the rear single line laser radar 904 assists the close-range detection of obstacles with the principle of reflection of the emitted single line laser beam and the calculation of the relative distance through the reflection time;

a front single line laser radar 906 and a front millimeter wave radar 907 provided at the front of the chassis 3; the front millimeter wave radar 907 is used to measure the distance information of the obstacle in front, and the front single line laser radar 906 is used to assist the close-range detection of the obstacle.

A reflecting plate I 10 is provided on the front side of the rear seat 5; a reflecting plate II 11 is provided on the front side of the landing gear 4. The setting of the reflecting plate is to enhance the reflection of the radar wave to improve the accuracy of the position information, wherein the reflecting plate I 10 is to enhance the position accuracy of the coupling/decoupling of the vehicle coupler 8 and the vehicle pin 7; the reflecting plate II 11 is to enhance the position accuracy of the chassis 3 when passing through the distance between the two landing gears 4 and docking with the deck 2.

A lifting mechanism 12 is further provided at the front end of the chassis 3, and the lifting mechanism 12 is provided with a front camera unit 13, a real-time satellite positioning system 14 and a three-dimensional laser radar 15. When the chassis carries the multifunctional cabin 1 for autonomous driving, the lifting mechanism 12 lifts the front camera unit 13, the real-time satellite positioning system 14 and the three-dimensional laser radar 15 to obtain a wider range of environmental signals and assists the chassis in autonomous driving.

Figure 6:
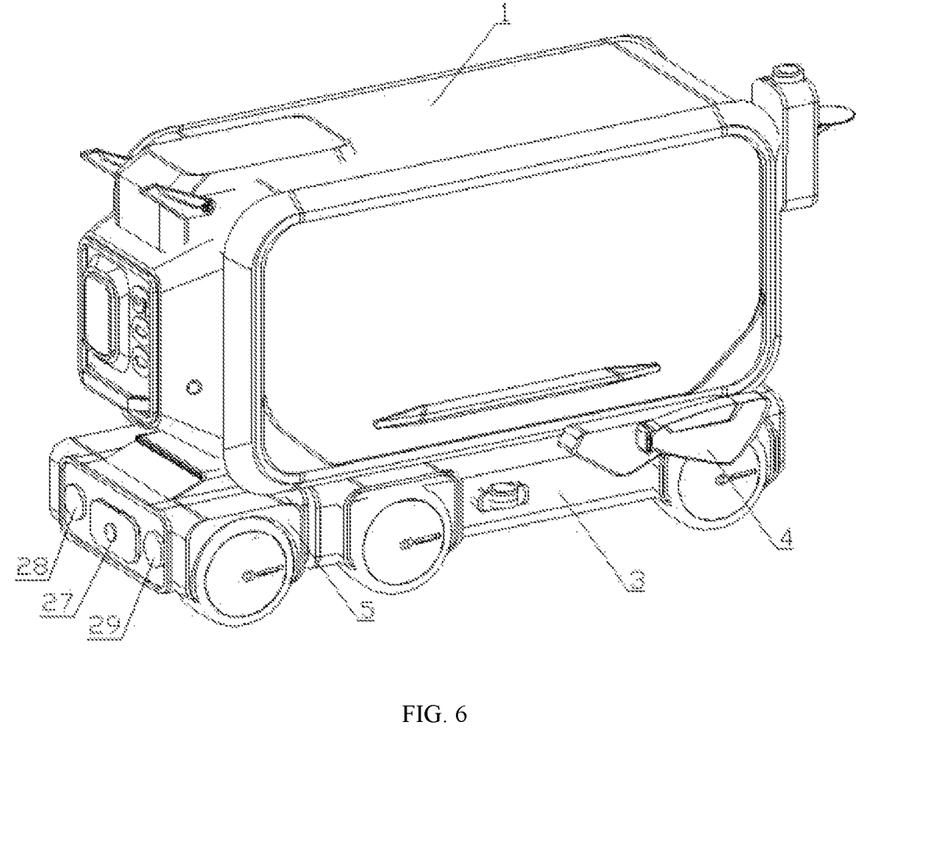
FIG. 6 is a front isometric view of the assembly of the multifunctional cabin, deck and chassis of the invention.
Figure 7:
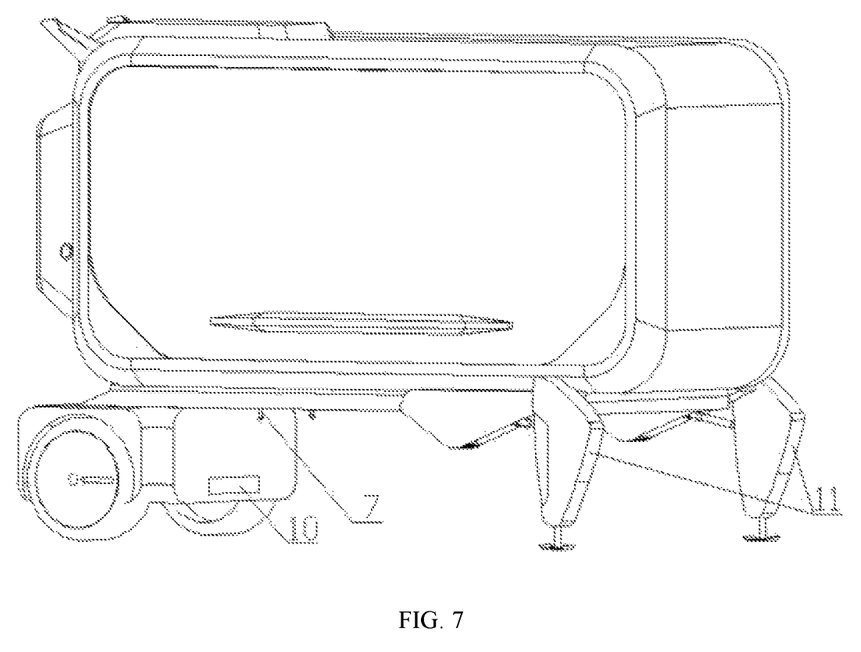
FIG. 7 is a schematic view illustrating the structure of the assembly of the multifunctional cabin and the deck of the invention.
Figure 8:
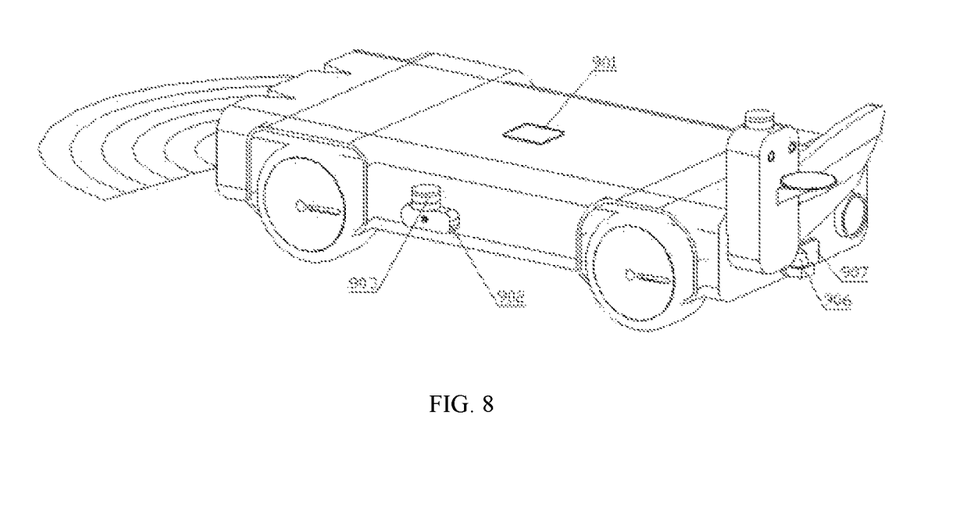
FIG. 8 is a front isometric view of the chassis of the invention.
Figure 9:
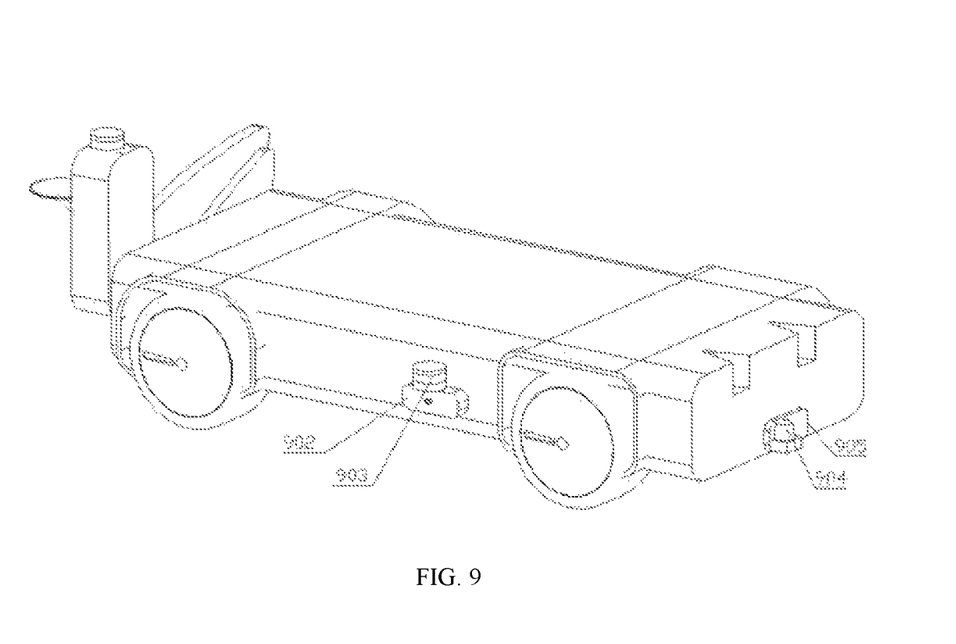
FIG. 9 is a rear isometric view of the chassis of the invention.
Figure 10:
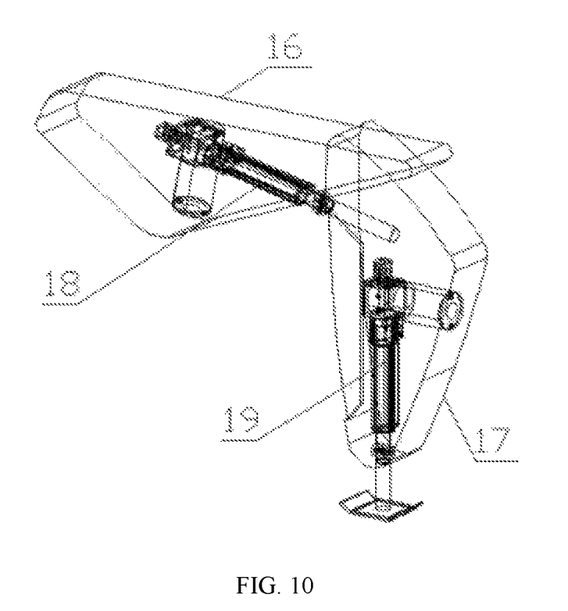
FIG. 10 is a schematic view illustrating the structure of the landing gear of the invention.

In the embodiment, the autonomous driving system of the chassis 3 can adopt conventional unmanned driving systems such as Autoware, Baidu's Apollo or Google's unmanned driving system;

the correction algorithm of the attitude correction module 9 can adopt the current conventional SLAM technology;

the landing gear 4 can adopt a landing gear structure as shown in FIG. 6; the structure thereof is: it comprises a horizontal support arm 16, and the horizontal support arm 16 is hinged with a vertical support arm 17; an electric putter I 18 is connected between the horizontal support arm and the vertical support arm, and the vertical support arm 17 is driven to vertically expand and contract horizontally by the electric putter I 18; an electric putter II 19 is further provided in the vertical support arm 17 for supporting the ground.

The vehicle pin 7 and the vehicle coupler 8 can adopt the vehicle pin and vehicle coupler of Holland Cruciform and SAF-Holland FW17, respectively;

the inertial navigation unit 901 can adopt XSENS MTi-300;

the positioning camera unit 27 and the side camera unit 902 adopt wide-angle cameras;

the positioning millimeter wave radar 29, the side millimeter wave radar 903, and the rear millimeter wave radar 905 can all adopt Continental SRR308, and the front millimeter wave radar 907 adopts Continental ARS408-21;

the positioning single line laser radar 28, the rear single line laser radar 904, and the front single line laser radar 906 can all adopt HOKUYO UST-20LX;

the reflecting plate I, the reflecting II, and the reflecting III can all adopt 3M™ Diamond Grade™;

the lifting mechanism can adopt conventional mechanical arms;

the front camera unit 13 can adopt FLIR Blackfly S BFS-PGE-16S2C;

the real-time satellite positioning system 14 (RTK GNSS) can adopt the current conventional satellite positioning system;

the three-dimensional laser radar 15 can adopt Velodyne VLP32.

What is claimed is:

1. A house structure with expandable function, comprising a house body (20), wherein an elevator shaft (21) is provided in the house body (20), and a carrying elevator (22) is provided in the elevator shaft (21); a multifunctional balcony (23) is further provided on both sides of the elevator shaft (21), and the multifunctional balcony (23) and the elevator shaft (21) are connected via a landing door (24); the car of the carrying elevator (22) is provided with a car front door, a car left door and a car right door, respectively; a multifunctional cabin (1) can be detachably connected to an automatic carrying system (35) capable of autonomous driving; wherein an electrical plug (25) is provided on the wall of the multifunctional balcony (23) opposite to the landing door (24), and the electrical plug (25) is detachably connected to the multifunctional cabin (1); wherein the automatic carrying system (35) comprises a deck (2); the top of the deck (2) is detachably connected to the bottom of the multifunctional cabin (1), and the bottom of the deck (2) is detachably connected to a chassis (3) capable of autonomous driving; a landing gear (4) is provided on both sides of one end of the deck (2), a rear seat (5) is provided at the other end, and a rear wheel (6) is provided at the bottom of the rear seat (5); a vehicle pin (7) is provided at the bottom of the deck (2); a vehicle coupler (8) is provided on the rear end of the chassis (3), and an attitude correction module (9) is further provided on the chassis (3); the chassis (3) can pass through the distance between the two landing gears (4), and can be detachably connected to the deck (2) via coupling/decoupling of the vehicle coupler (8) and the vehicle pin (7).

2. The house structure with expandable function according to claim 1, wherein a joint positioning module is provided on the rear side of the rear seat (5).

3. The house structure with expandable function according to claim 2, wherein the joint positioning module comprises: a positioning camera unit (27) for collecting position information of the electrical plug (25) on the wall; a positioning single line laser radar (28) for the docking positioning detection between the multifunctional cabin and the electrical plug (25) on the wall; a positioning millimeter wave radar (29) for measuring the distance between the multifunctional cabin and the electrical plug (25) on the wall.

4. The house structure with expandable function according to claim 3, wherein a pair of reflecting plates III (30) is further provided on the wall of the multifunctional balcony (23) opposite to the landing door (24), and the electrical plug (25) is located in the middle of the two reflecting plates III (30).

5. The house structure with expandable function according to claim 1, wherein a docking fine-tuning mechanism is provided at the bottom of the chassis (3), and the docking fine tuning mechanism comprises a lifting support mechanism (31); the lower four corners of the lifting support mechanism (31) are provided with Mecanum wheels (32), and each Mecanum wheel (32) is driven by a fine-tuning drive motor (33) individually.

6. The house structure with expandable function according to claim 1, wherein the attitude correction module (9) comprises: an inertial navigation unit (901) provided on the chassis (3), a side camera unit (902) and a side millimeter wave radar (903) provided on both sides of the chassis (3), a rear single line laser radar (904) and a rear millimeter wave radar (905) provided at the rear of the chassis (3), a front single line laser radar (906) and a front millimeter wave radar (907) provided at the front of the chassis (3).

7. The house structure with expandable function according to claim 6, wherein a reflecting plate I (10) is provided on the front side of the rear seat (5); a reflecting plate II (11) is provided on the front side of the landing gear (4).

8. The house structure with expandable function according to claim 6, wherein a lifting mechanism (12) is further provided at the front end of the chassis (3), and the lifting mechanism (12) is provided with a front camera unit (13), a real-time satellite positioning system (14) and a three-dimensional laser radar (15).

\* \* \* \* \*